(12) United States Patent
Zhu et al.

(10) Patent No.: US 11,699,080 B2
(45) Date of Patent: Jul. 11, 2023

(54) COMMUNICATION EFFICIENT MACHINE LEARNING OF DATA ACROSS MULTIPLE SITES

(71) Applicant: Cisco Technology, Inc., San Jose, CA (US)

(72) Inventors: Xiaoqing Zhu, Austin, TX (US); Yaqi Wang, Sunnyvale, CA (US); Dan Tan, Sunnyvale, CA (US); Rob Liston, Menlo Park, CA (US); Mehdi Nikkhah, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1272 days.

(21) Appl. No.: 16/131,150

(22) Filed: Sep. 14, 2018

(65) Prior Publication Data

US 2020/0090002 A1 Mar. 19, 2020

(51) Int. Cl.
*G06N 20/00* (2019.01)
*G06N 20/10* (2019.01)
*G06N 3/088* (2023.01)
*G06N 3/045* (2023.01)
*G06N 5/01* (2023.01)
(Continued)

(52) U.S. Cl.
CPC ............ *G06F 18/2155* (2023.01); *G06F 9/48* (2013.01); *G06F 18/253* (2023.01); *G06N 3/045* (2023.01); *G06N 3/088* (2013.01); *G06N 5/01* (2023.01); *G06N 20/00* (2019.01); *G06N 20/10* (2019.01); *H04Q 9/00* (2013.01)

(58) Field of Classification Search
CPC ........ G06K 9/6259; G06K 9/629; G06F 9/48; G06N 3/0454; G06N 3/088; G06N 5/003; G06N 20/00; G06N 20/10; G06N 3/0472; H04Q 9/00
See application file for complete search history.

(56) References Cited

U.S. PATENT DOCUMENTS 11,461,690 B2 * 10/2022 Szeto ..................... G06N 20/00
2016/0140451 A1 5/2016 Li et al.
(Continued)

OTHER PUBLICATIONS

Konečný, Jakub, et al. "Federated optimization: Distributed machine learning for on-device intelligence." arXiv preprint arXiv: 1610.02527 (2016). https://arxiv.org/pdf/1610.02527.pdf (Year: 2016).*
(Continued)

*Primary Examiner* — Kakali Chaki
*Assistant Examiner* — Michael H Hoang
(74) *Attorney, Agent, or Firm* — Behmke Innovation Group; Kenneth J. Heywood; Jonathon P. Western

(57) ABSTRACT

In one embodiment, a service receives machine learning-based generative models from a plurality of distributed sites. Each generative model is trained locally at a site using unlabeled data observed at that site to generate synthetic unlabeled data that mimics the unlabeled data used to train the generative model. The service receives, from each of the distributed sites, a subset of labeled data observed at that site. The service uses the generative models to generate synthetic unlabeled data. The service trains a global machine learning-based model using the received subsets of labeled data received from the distributed sites and the synthetic unlabeled data generated by the generative models.

20 Claims, 10 Drawing Sheets

(51) Int. Cl.
  *G06F 18/214* (2023.01)
  *H04Q 9/00* (2006.01)
  *G06F 9/48* (2006.01)
  *G06F 18/25* (2023.01)

(56) References Cited

U.S. PATENT DOCUMENTS

2017/0293836 A1  10/2017  Li et al.
2018/0053071 A1  2/2018  Chen et al.

OTHER PUBLICATIONS

Miyato, Takeru, et al. "Virtual adversarial training: a regularization method for supervised and semi-supervised learning." IEEE transactions on pattern analysis and machine intelligence 41.8 (2018): 1979-1993. https://arxiv.org/pdf/1704.03976.pdf (Year: 2018).*

McMahan, Brendan, et al. "Communication-efficient learning of deep networks from decentralized data." Artificial intelligence and statistics. PMLR, 2017. https://arxiv.org/pdf/1602.05629.pdf (Year: 2017).*

Odena, Augustus. "Semi-supervised learning with generative adversarial networks." arXiv preprint arXiv:1606.01583 (2016). https://arxiv.org/pdf/1606.01583.pdf (Year: 2016).*

Kingma, Diederik P., and Max Welling. "Auto-encoding variational bayes." arXiv preprint arXiv:1312.6114 (2013). https://arxiv.org/pdf/1312.6114.pdf (Year: 2013).*

Smith, Virginia, et al. "Federated multi-task learning." Advances in neural information processing systems 30 (2017). https://proceedings.neurips.cc/paper/2017/file/6211080fa89981f66b1a0c9d55c61d0f-Paper.pdf (Year: 2017).*

Hitaj, Briland, Giuseppe Ateniese, and Fernando Perez-Cruz. "Deep models under the GAN: information leakage from collaborative deep learning." Proceedings of the 2017 ACM SIGSAC conference on computer and communications security. 2017. https://dl.acm.org/doi/pdf/10.1145/3133956.3134012 (Year: 2017).*

Jiang, Zheng, et al. "Training sample selection for deep learning of distributed data." 2017 IEEE International Conference on Image Processing (ICIP). IEEE, 2017. https://ieeexplore.ieee.org/stamp/stamp.jsp?tp=&arnumber=8296670 (Year: 2017).*

Merugu, Srujana, and Joydeep Ghosh. "Privacy-preserving distributed clustering using generative models." Third IEEE International Conference on Data Mining. IEEE, 2003. https://ieeexplore.ieee.org/abstract/document/1250922 (Year: 2003).*

Gaussier, et al., "Learning from partially labelled data—with confidence", Proc. of the 22nd ICML Workshop on Learning with Partially Classified Training Data, 8 pages, 2005.

Maximov, et al., "Rademacher Complexity Bounds for a Penalized Multiclass Semi-Supervised Algorithm", arXiv:1607.00567v3, 26 pages, 2018, arXiv.org.

* cited by examiner

COMMUNICATION EFFICIENT MACHINE LEARNING OF DATA ACROSS MULTIPLE SITES

TECHNICAL FIELD

The present disclosure relates generally to computer networks, and, more particularly, to communication efficient machine learning of data across multiple sites.

BACKGROUND

As the use of machine learning in computer networks continues to increase over time, the physical limitations of a network may present barriers to deployment. For example, consider the case in which a machine learning model is to be trained centrally using training data from any number of distributed locations. In this scenario, this can be achieved by transmitting the training data from all of the different locations to a central entity. However, doing so will also consume more network bandwidth which may be prohibitively costly or even infeasible, in some cases.

Beyond the potential inability to leverage all available training data due to network constraints, the gathered data is also often only partially labeled. In general, labeling training data serves as examples during model training of the different classifications that can be applied to a new data sample. For example, in the context of image recognition, some images may be labeled as depicting a "car," while other images may be labeled as depicting a "bus." By doing so, the trained model may be able to distinguish between images that include a "car" vs. images that include a "bus." However, in the real world, it is relatively rare to have fully labeled data to serve as a ground-truth for purposes of model training. Indeed, labeling data can be very labor intensive and, even when labeling is automated, not every potential data source may have requisite knowledge to label the data. For example, security camera images can be associated with badge reader information, to better label the images. However, not every camera may have a corresponding badge reader to leverage for purposes of data labeling.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
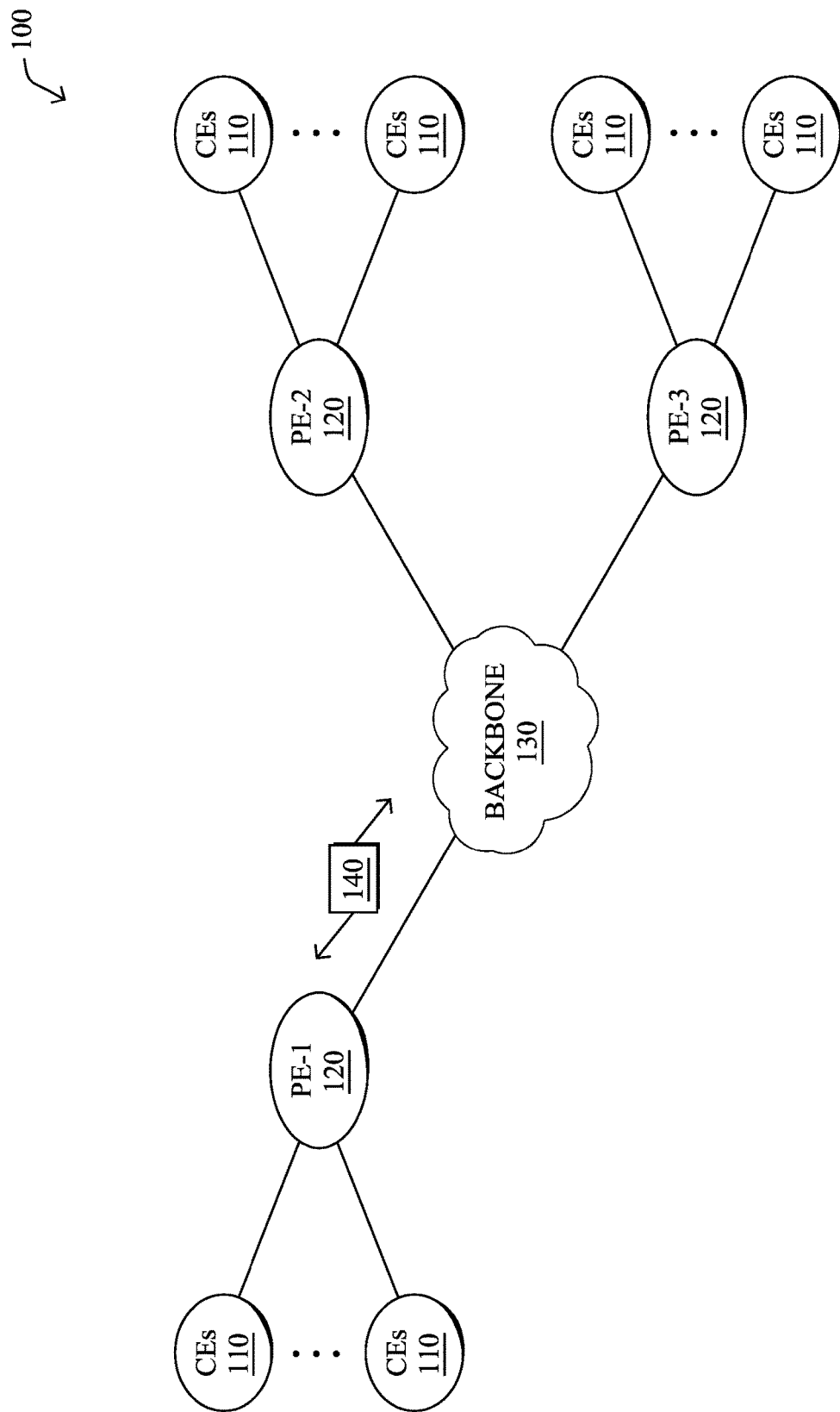
FIGS. 1A-1B illustrate an example communication network.

According to one or more embodiments of the disclosure, a service receives machine learning-based generative models from a plurality of distributed sites. Each generative model is trained locally at a site using unlabeled data observed at that site to generate synthetic unlabeled data that mimics the unlabeled data used to train the generative model. The service receives, from each of the distributed sites, a subset of labeled data observed at that site. The service uses the generative models to generate synthetic unlabeled data. The service trains a global machine learning-based model using the received subsets of labeled data received from the distributed sites and the synthetic unlabeled data generated by the generative models.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical 1o location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors)

result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site). 3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
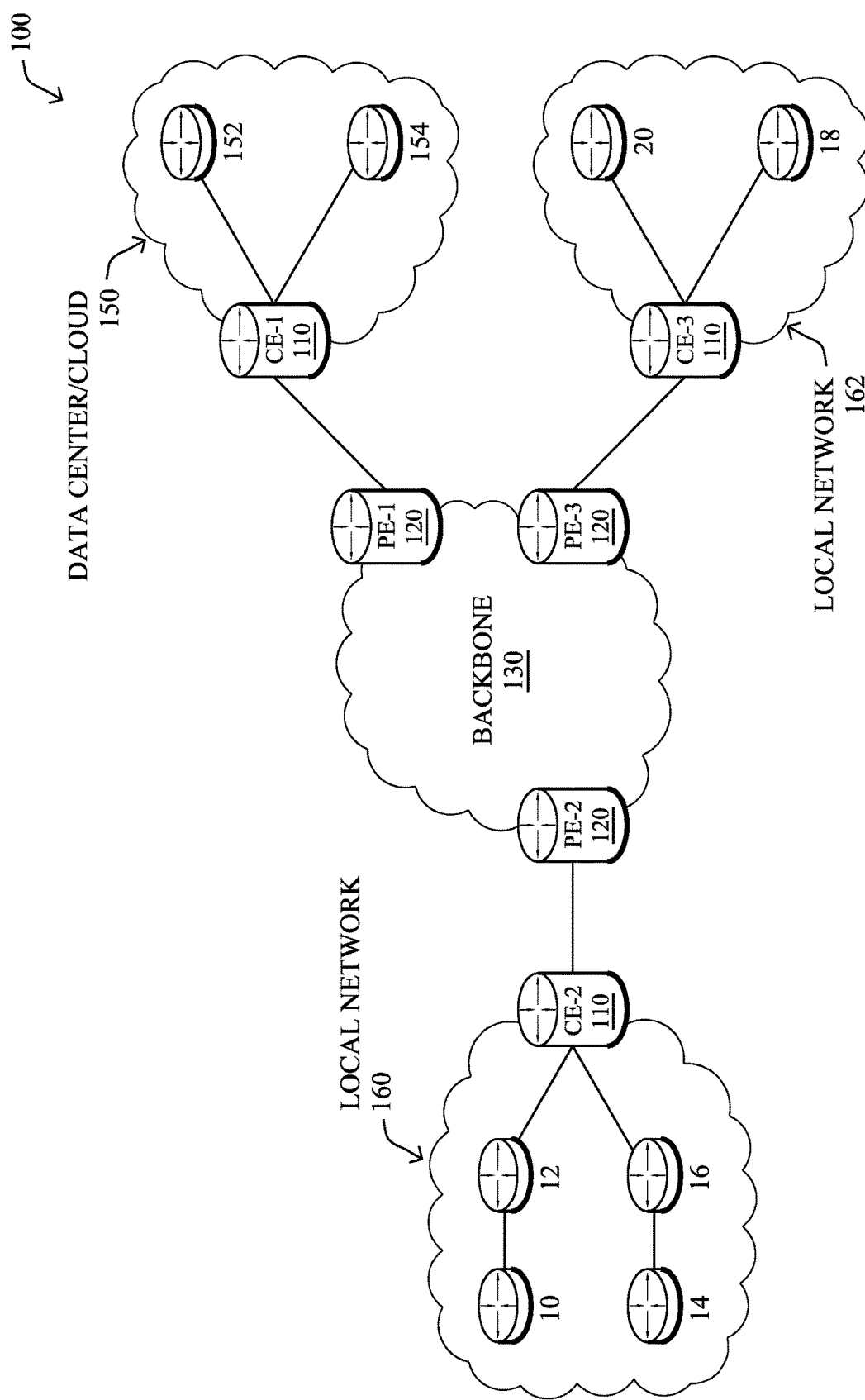

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained 1o application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
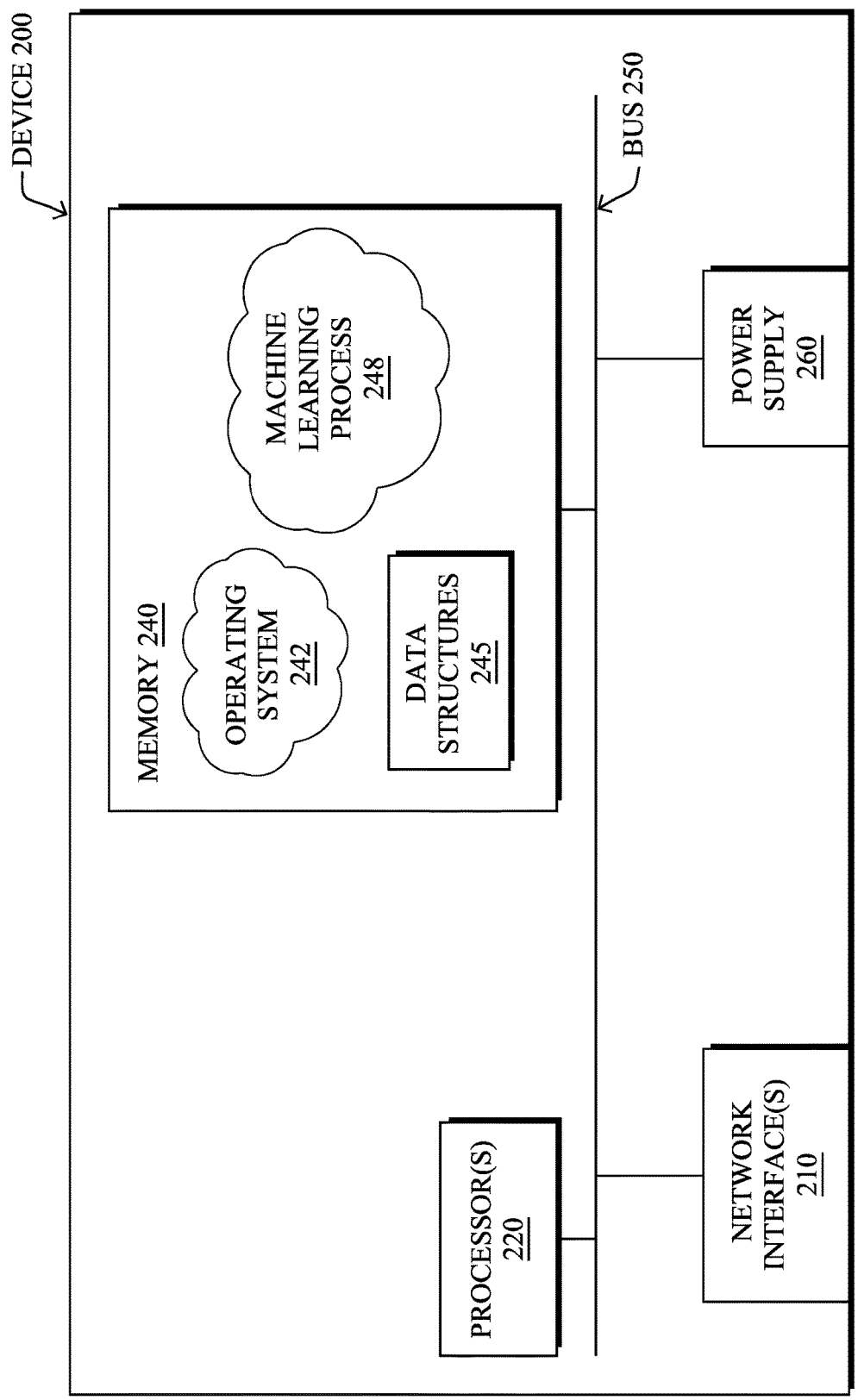
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154

(e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a machine learning process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, machine learning process 248 may execute one or more machine learning-based classifiers to classify data captured in the network for any number of purposes. In some embodiments, machine learning process 248 may assess captured sensor data, to assign one or more labels to the sensor data (e.g., whether a temperature reading is "suitable" or "too hot," what a captured image depicts, etc.). In further embodiments, machine learning process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, machine learning process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Machine learning process 248 may employ any number of machine learning techniques, to classify the gathered data observed in the network(s). In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, machine learning process 248 can use the model M to classify new data points, such as information regarding new traffic flows in the network, new data samples from sensors, etc. Often, M is a statistical model, and the cost function is inversely proportional to the likelihood of M, given the input data.

In various embodiments, machine learning process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that machine learning process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
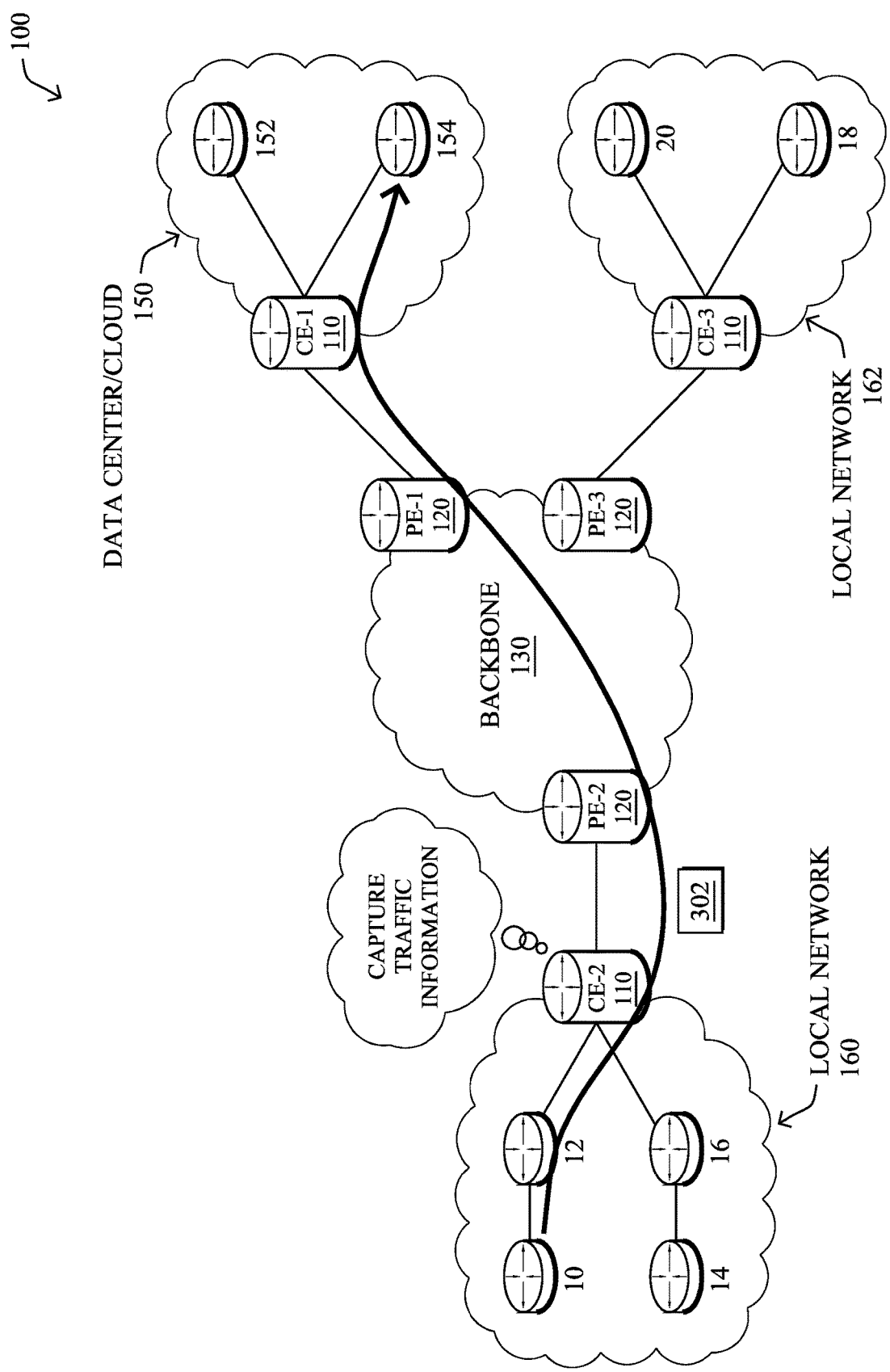
FIG. 3 illustrates an example of a device capturing traffic information.

FIG. 3 illustrates the capture of information about network traffic, such as telemetry data for a traffic flow, in one potential scenario in which machine learning may be used for purposes of analyzing the captured information. As would be appreciated, this is but one potential use case for the techniques herein and the techniques are not limited as such. As shown, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, many real-life scenarios exist for the use of machine learning to analyze data observed by a network. For example, machine learning can be used for purposes of analyzing the performance of a network, performing security assessments in the network (e.g., detecting traffic flows indicative of malware, etc.), sensor analysis (e.g., analyzing camera data, etc.), performing anomaly detection, and the like. However, the distributed nature of the data sources, as well as the potential for the data only to be partially labeled, makes centralized model training difficult, if not impossible, in many cases.

Communication Efficient Machine Learning of Data Across Multiple Sites

The techniques herein allow for machine learning model training using partially labeled data from across multiple geographical locations, without the need for aggregating all measured data to a central location. In various aspects, the techniques herein can be applied to a wide range of learning tasks, such as representation learning (e.g., anomaly detection), classification (e.g., employee identification, etc.), and regression (e.g., application performance score prediction). In further aspects, the techniques herein support the learning of heterogeneous data (e.g., labeled vs. unlabeled, unbalanced class distributions) across different sites.

Specifically, according to one or more embodiments of the disclosure as described in detail below, a service receives machine learning-based generative models from a plurality of distributed sites. Each generative model is trained locally at a site using unlabeled data observed at that site to generate synthetic unlabeled data that mimics the unlabeled data used to train the generative model. The service receives, from each of the distributed sites, a subset of labeled data observed at that site. The service uses the generative models to generate synthetic unlabeled data. The service trains a global machine learning-based model using the received subsets of labeled data received from the distributed sites and the synthetic unlabeled data generated by the generative models.

Illustratively, the techniques described herein may be performed by hardware, software, and/or firmware, such as in accordance with the machine learning process 248, which may include computer executable instructions executed by the processor 220 (or independent processor of interfaces 210) to perform functions relating to the techniques described herein.

Operationally, the techniques herein enable the training of a global machine learning model (e.g., an image classifier, a traffic analyzer, etc.) across multiple sites with partially labelled data. In various embodiments, semi-supervised training can be performed at a central location, such as in the cloud, combining synthetic unlabeled data from generative models trained locally at the distributed sites and a subset of selected original labeled data from the sites.

Figure 4:
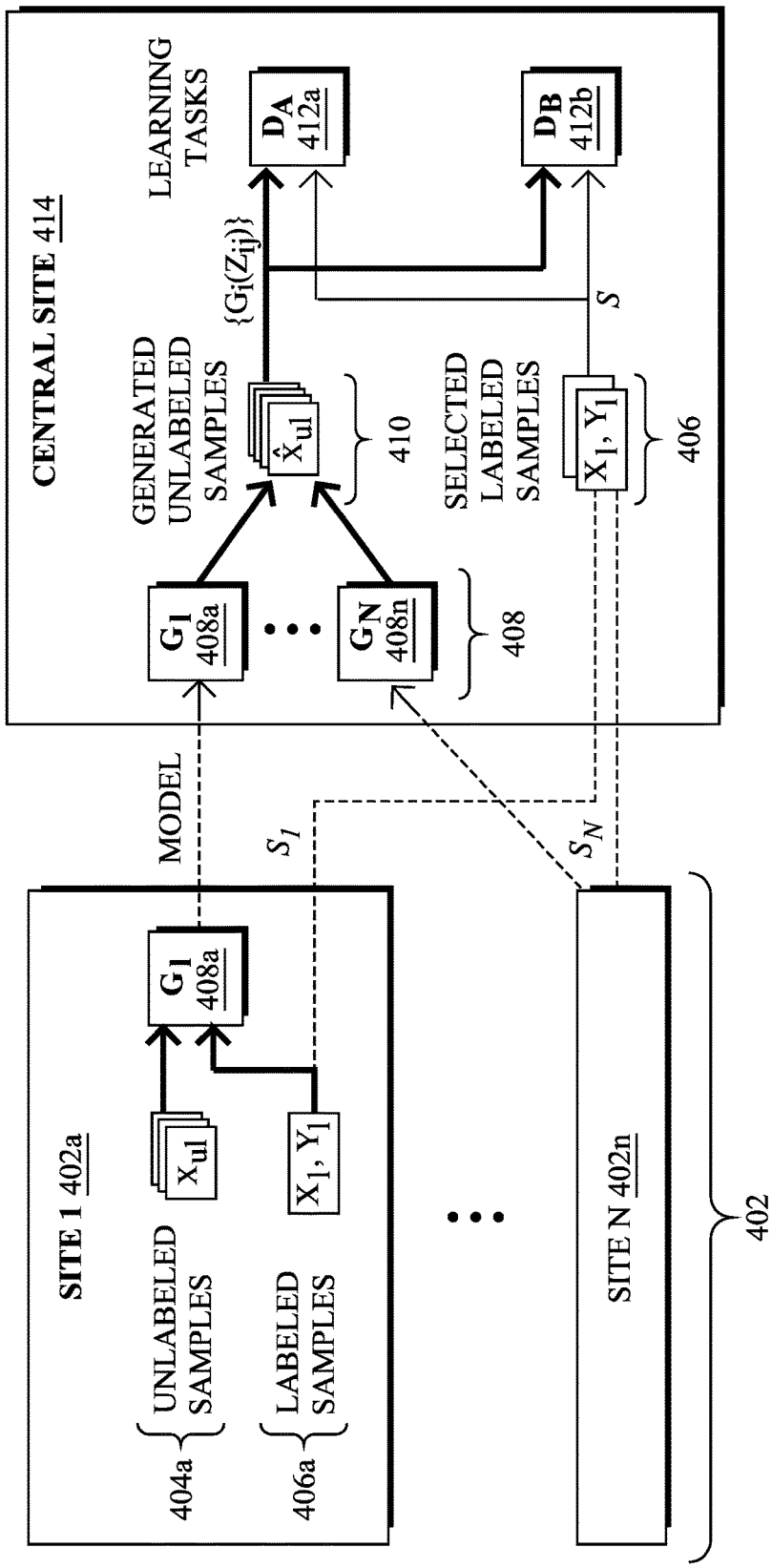
FIG. 4 illustrates an example architecture for centralized learning using partially labeled data from multiple sites.

FIG. 4 illustrates an example architecture 400 for centralized learning using partially labeled data from multiple sites, according to various embodiments. As shown, assume that there are n-number of different geographical sites 402 that are in communication with a central site 414. For example, each of sites 402 may comprise local networks (e.g., local networks 160, 162 shown in FIG. 3) that are in communication with a central site 414 (e.g., a data center or cloud computing environment 150).

As shown, assume that data samples are captured at each of sites 402. For example, the data samples may be image data, network telemetry data, other sensor data, or any other observation/measurement data captured by the devices of sites 402. In many cases, the captured observation data may only be partially labeled, leading to two sets of captured data: unlabeled samples 404 and labeled samples 406. For example, consider the case of a security camera located at the entrance of a building. If the building also requires users to scan their access badges as they enter the building, information about the user from the badge reader can be used to label the corresponding image data captured by the camera. Conversely, a security camera located in the tenth floor hallway of the building may not have a corresponding badge reader from which label information can be obtained. In another example, may be a network expert is asked to manually label traffic flow information for every 100$^{th}$ sample obtained by the network.

According to various embodiments, a key feature of the techniques herein is the local training of machine-learning based generative models 408 at each of sites 402 using the captured unlabeled and/or labeled samples 404, 406 from that site. For example, as shown, unlabeled samples 404a and/or labeled samples 406a captured at site 402a can be used to train a generative model 408a at site 402a. In various embodiments, each generative model 408 may be trained using the locally observed unlabeled data 404 to mimic the observed data samples from low-dimensionally random noise input. For example, each generative model 408 may comprise a generative adversarial network (GAN), such as a Wasserstein GAN or adversarial learning inference (ALI)-based GAN, that is trained to generate synthetic data that mimics the observed unlabeled samples 402 for that site.

Pseudocode for local training of generative models 408 is as follows:

```
for each site i ∈ {1, 2, ... , N} do
    Train generative model G_i from X_i^(l), X_i^(ul)
    Sample X_i^(l) to form S_i
    Transmit G_i and S_i to central site
end for
```

Said differently, at each site 402, a generative model G may be trained to synthesize unlabeled samples 410 that exhibit similar properties as that of the unlabeled samples 404 observed at that site. In turn, the model 408, as well as a subset of the labeled samples 406 observed at that site, may be sent to central site 414 for processing. In various embodiments, selection of the labeled samples 406 to be sent to central site 414 may be purely random, based on similarities between samples bearing the same label, or based on their inference output from the current version of the global learning model.

Using the generative models 408 and selected labeled samples 406 received from the various sites 402, the device at the central site 414 can train a global machine learning model. In some embodiments, this training may first entail using generative models 408 to generate synthetic unlabeled data samples 410 at central site 414. Typically, the relative proportion of generated samples 410 may reflect the data size of samples at each site 402. For instance, if site 402a observes one hundred samples per day but site 402b observes one thousand samples per day, then the ratio of synthetic samples from their respective generative models 408 may also be kept at 1:10.

In some cases, labeled samples 406 may include multiple labels. For example, an image can be labeled at site 402a with a first label that indicates whether a face in the image carries a smile, a second label for gender, a third label for age, etc. In such cases, the generative models 408 trained using one set of labels can be reused for multiple tasks (e.g., one for gender detection, another for age detection, etc.). Thus, in some embodiments, the labels used by the final learning tasks 412 may differ from the specific labels 406 used to train the generative models 408. Notably, if generative models 408 are trained to generate unlabeled images, as long as the images look acceptable, the generative models do not need to be specific to a particular label. For example, if the generative models 408 are trained using labeled data for smile and gender, the unlabeled images that they generate can still be used for purposes of training a global model that labels images according to the age of the depicted person.

The selection of which labeled samples 406, $S_1$-$S_N$, that are actually sent from sites 402 to central site 414 can be performed in a number of ways. In one embodiment, the selection of labeled samples 406 to be sent to central site 414 may be random. In further embodiments, central site 414 can send $D_A$ or $D_B$ back to sites 402, which sites 402 can use to pre-screen labeled samples 406. For example, given one image $X_1$ with label $Y_1$, the model $D_A$ or $D_B$ can classify image $X_1$ to determine the probabilities of $X_1$ also belonging to different labels. If the probability of $X_1$ having the actual label $Y_1$ is very high, it can be assumed that this image/label pair is well known in the system and would not carry much information back to central site 408. Thus, in this case, the labeled image could be excluded from selection for sending to central site 408. Conversely, if $D_A$ or $D_B$ at a site 402 predicts a low probability of image $X_1$ having label $Y_1$, then this image/label pair conveys information that model D does not know and should be selected for sending to central site 408.

In further embodiments, instead of fixing in advance the amount of labeled data sent from each site 402 to central site 414, central site 414 may request additional labeled data 406 from one or more of sites 402 via feedback messages (e.g., periodically, as needed, etc.). The decision by central site 414 to request additional labeled data 406 may be based on the training and validation of the central training. More specifically, the amount of additional labeled data 406 can be a function of the value of the loss function evaluated over training or validation datasets, when assessed. For example, a higher loss may lead central site 414 to request more labeled data 406 from sites 402, whereas a loss below a defined threshold may cause central site 414 to stop requesting additional labeled data 406.

Training of a global model 412 may generally entail using a semi-supervised learning approach, such as Virtual Adversarial Training (VAT), using the combination of synthetic unlabeled samples 410 and original labelled samples 406 sent to central site 414. More specifically, the learning task on X can be viewed as trying to find an optimal mapping f* in some space of functions F that minimizes the sum loss terms corresponding to the labeled and unlabeled data 406, 410, respectively:

$$f^*_{Hybrid\ GAN} = \mathrm{argmin}_{f \in \mathcal{F}} \mathcal{L}_l\left(\sum_{(x,y) \in S} f(x, y)\right) + \mathcal{L}_{ul}\left(\sum_{i=1}^{N} \sum_{j=1}^{M_i} f(G_i(z_{ij}), -)\right)$$

where $\mathcal{L}_l(\bullet)$ and $\mathcal{L}_{ul}(\bullet)$ denote loss functions associated with the labeled and unlabeled samples, respectively, $G_i$ are the generated samples, $z_{ij}$ are drawn independently, and $M_i$ is the number of generated samples from $G_i$. Note that this approach also uses only a subset $S_i$ from each of sites 402, as opposed to using the full set S of available labeled samples 406, thereby significantly reducing the communication costs to central site 414. As shown, in addition to the supervised training of learning task $D_A$ (e.g., model 412a), the same set of $G_i$ and $S_i$ can also be used to train a different learning task $D_B$ (e.g., model 412b).

In an alternative embodiment, training of the collection of synthetic unlabeled data can be used to train a new representation (data→feature mapping). Consequently, the collection of labeled data is also mapped to the feature space, and semi-supervised training is carried out in the feature space. Pseudocode for one potential training approach at central site 414 is as follows:

```
ul = { }
for i ∈ {1, 2,..., N} do
    Collect generative model G_i and labeled samples S_i
    Sample random vector z_ij ~ ℙ_z
    ul ← ul ∪ { G_ij | j = 1,...,M_i }
end for
Learn task f ∈ from ul and ∪_{i=1}^N S_i
```

Figure 5A:
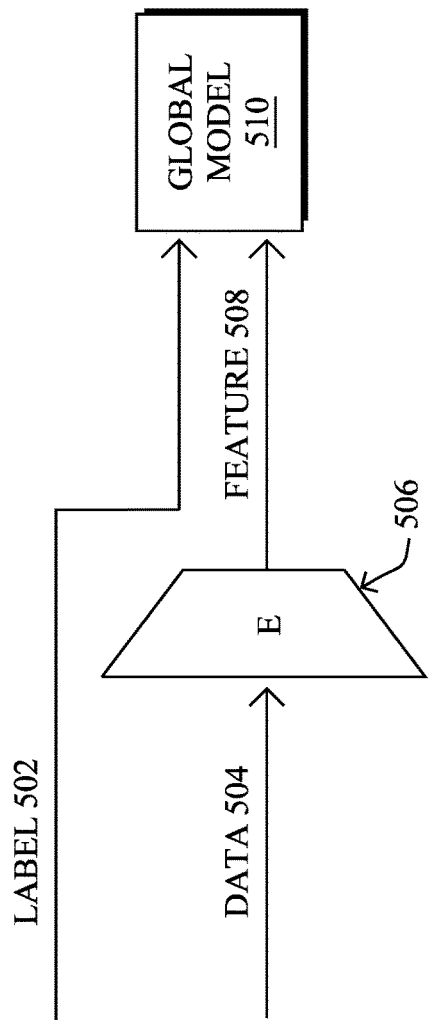
FIGS. 5A-5B illustrate examples of training approaches.
Figure 5B:
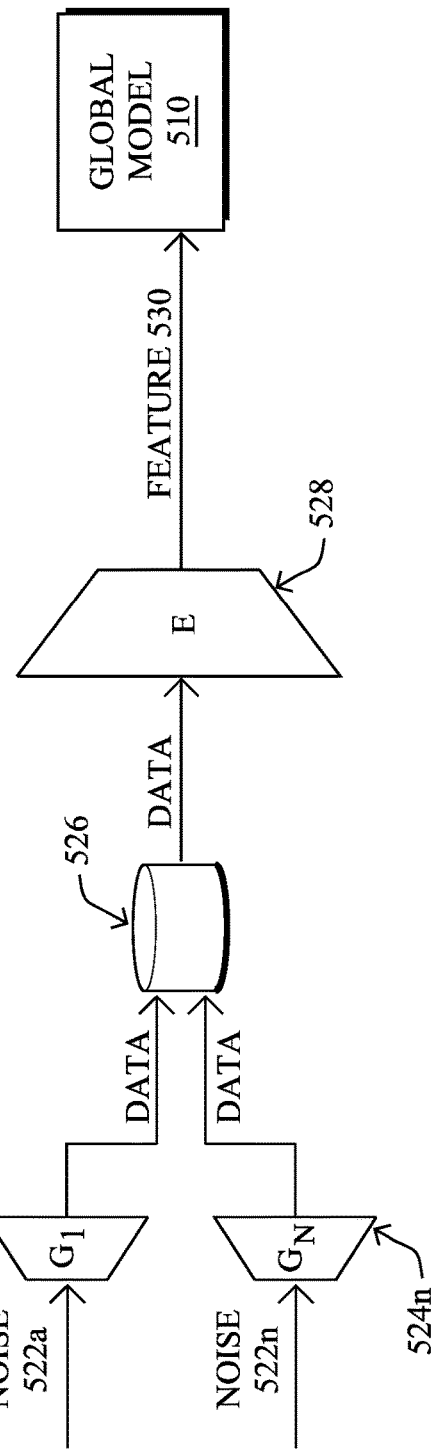

FIGS. 5A-5B illustrate examples of training approaches of the global model after representation learning, in various embodiments. As shown in FIG. 5A, global model 510 may be trained using only originally labeled samples, in one embodiment. More specifically, unlabeled data 504 may be mapped to features 508 by an encoder 506 and global model 510 trained using the labeled subset of data 502 and features 508 from encoder 506. In FIG. 5B, a further approach would be to train global model 510 using synthetic unlabeled samples. Notably, n-number of generative models 524 may take as input noise 522 and output a set of synthetic data 526. In turn, synthetic data 526 can be fed to encoder 528 for mapping to features 530, which can then be used to train global model 510.

Figure 6:
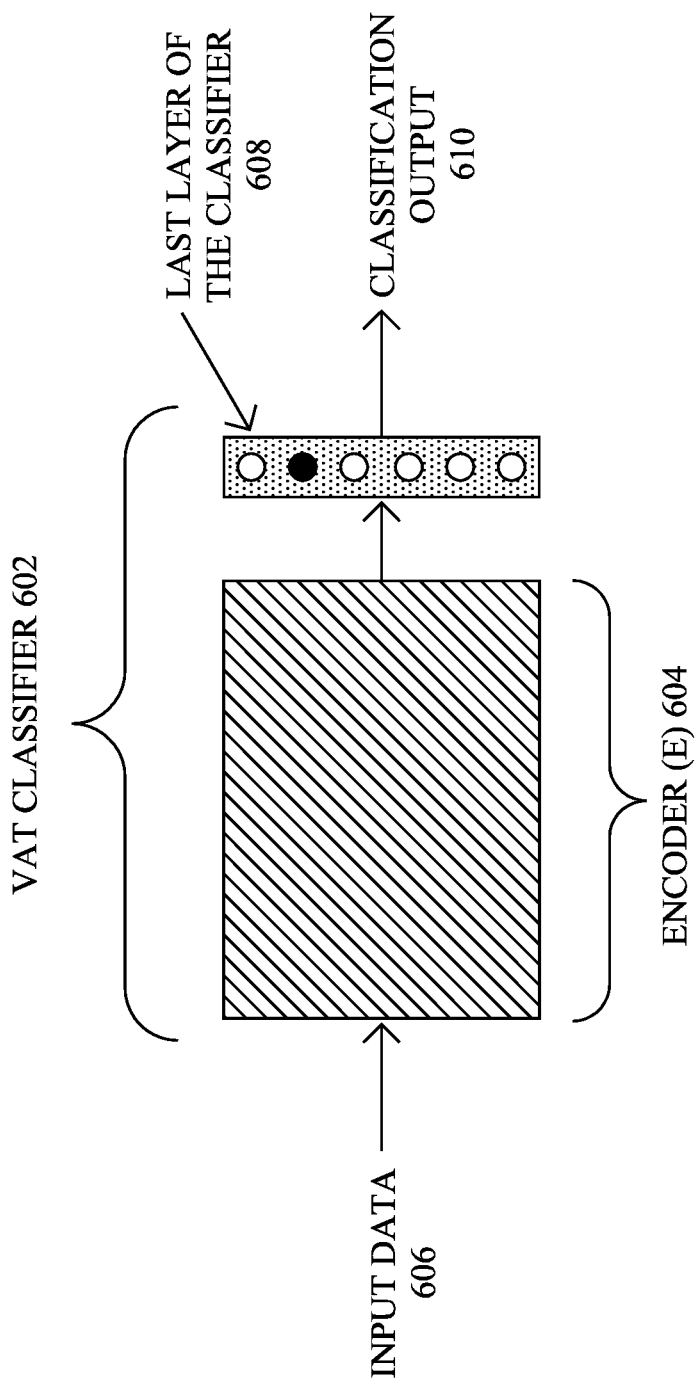
FIG. 6 illustrates an example virtual adversarial training (VAT) classifier.

FIG. 6 illustrates an example virtual adversarial training (VAT) classifier 602, according to various embodiments. In some embodiments, VAT classifier 602 can be used to implement either, or both, of encoders 506 and 528 in FIGS. 5A-5B. Note, however, that the use of encoders 506 and 528 are optional, in further embodiments. For example, rather than using VAT classifier 602 to implement encoder 506 in global model 510, VAT classifier 602 itself could also be used to implement global model 510, i.e., without encoder 506. As shown, VAT classifier 602 may include an encoder 604 that takes data 606 as input. In turn, the last layer 608 of VAT classifier 602 may be used as the classification output 610. Note that encoder 604 requires partially labeled data to be trained in a semi-supervised manner.

Figure 7:
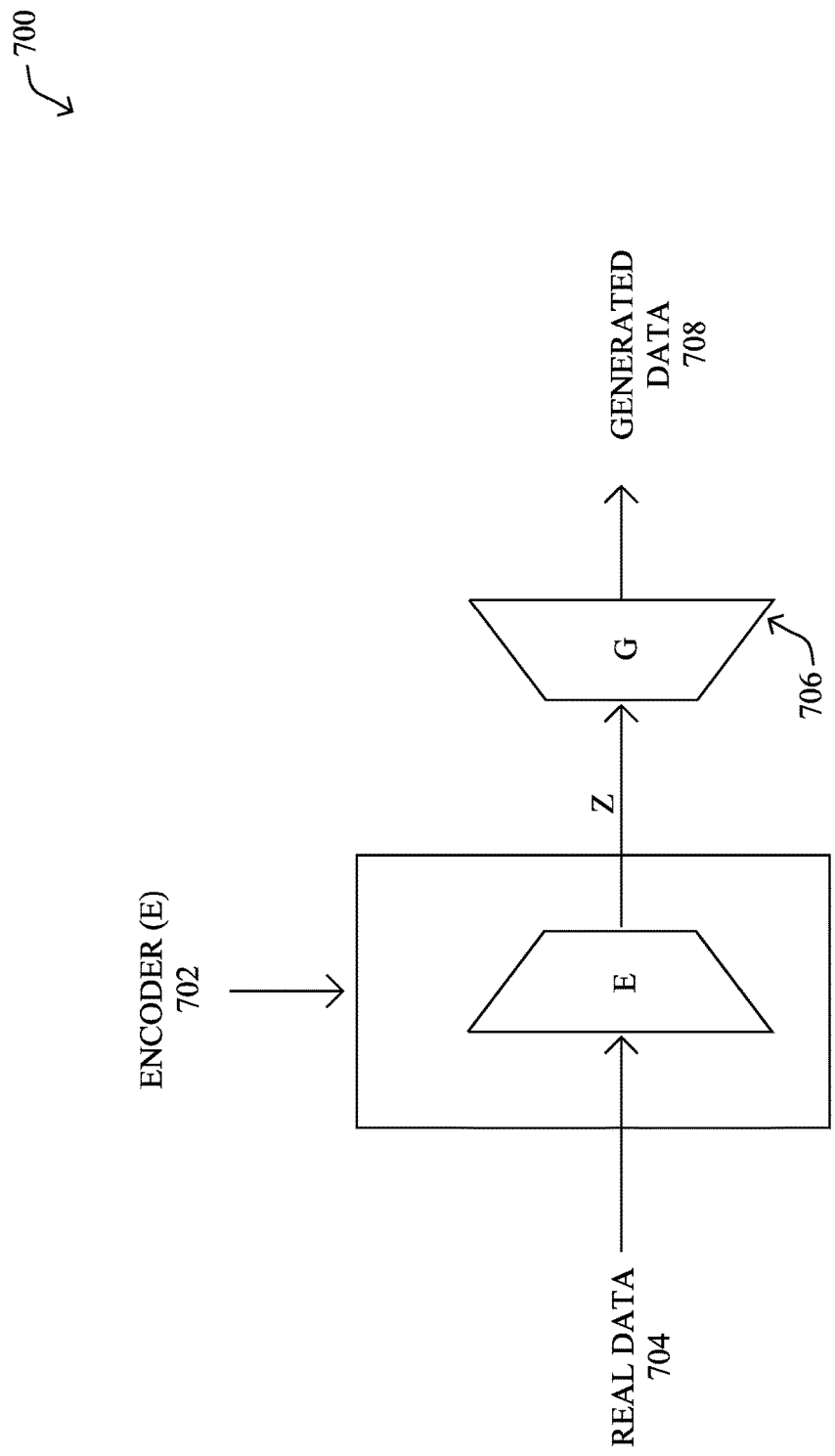
FIG. 7 illustrates an example autoencoder.

FIG. 7 illustrates an example autoencoder 700 that can also be used to implement encoder 528 shown in FIG. 5B, in further embodiments. Notably, autoencoder 700 can be trained without labels. As shown, autoencoder 700 may include an encoder 702 that takes as input real data 704 and a coupled decoder/generator 706 that outputs generated data 708.

Figure 8:
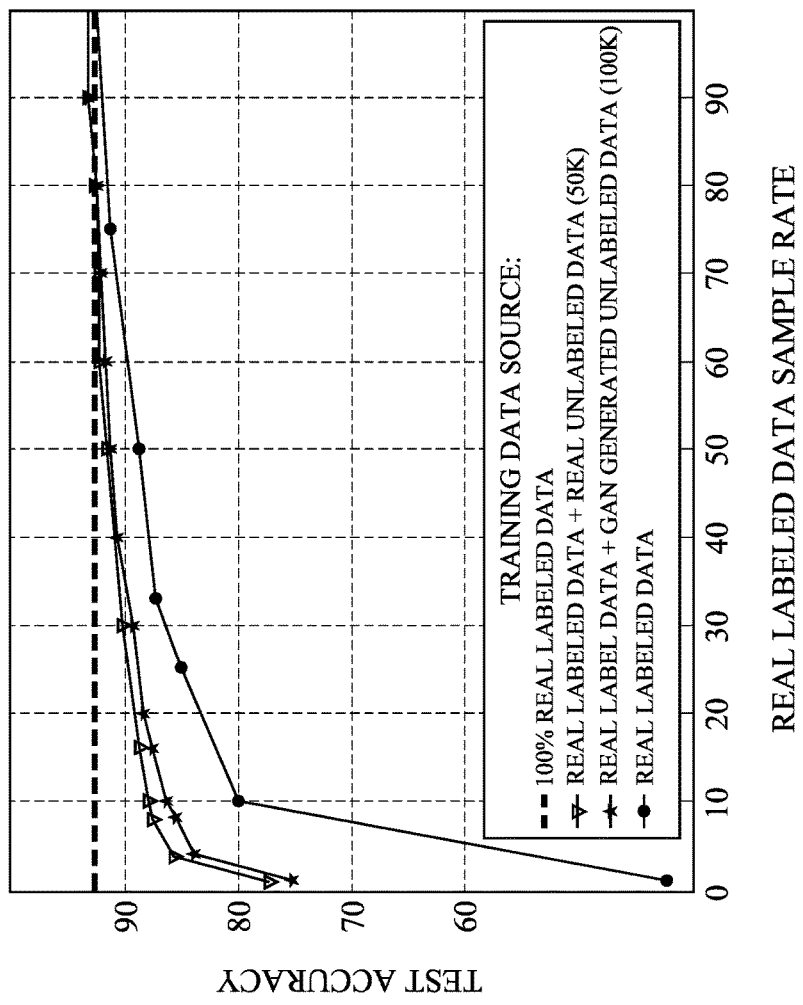
FIG. 8 illustrates an example plot of test results.

To verify the efficacy of the techniques herein, a prototype model was constructed in python and evaluated using the publicly available image classification dataset, CIFAR-10. FIG. 8 illustrates an example plot 800 of the resulting test results. The x-axis of plot 800 is the percentage of data with label, and the y-axis of plot 800 is the accuracy of a classifier trained using the distributed data. For purposes of comparison, a classifier was trained using the following data sources:
  100% real labeled data—i.e., all available data from all sites
  Real labeled data+Real unlabeled data (50 k samples)
  Real labeled data+GAN/synthetic generated unlabeled data (100 k samples)
  Real labeled data without model parameters from the edge As shown, the performance of the classifier trained using all available data from all sites represents the upper bound of performance. The classifier trained using both the real labeled and unlabeled data from the sites exhibits the second best performance and approaches the performance of the classifier trained with the full labeled dataset as the data sample rate increases.

Of most significant note is that the classifier trained using a portion of the real labeled data, as well as synthetically generated unlabeled data, exhibits very close performance to that of the classifier trained using the real labeled and unlabeled data. This means that model training using synthetic data and a subset of labeled data from the sites can very closely approximate the performance of a model trained using actual labeled and unlabeled data from the sites. However, synthetic training data means less overhead on the network, as the real unlabeled data does not need to be transferred to the central site for training but can be generated synthetically, instead. Also of note is that the classifier trained using labeled samples only, without any other model parameters from the edge, exhibits a significant drop in performance over that of the other classifiers.

Figure 9:
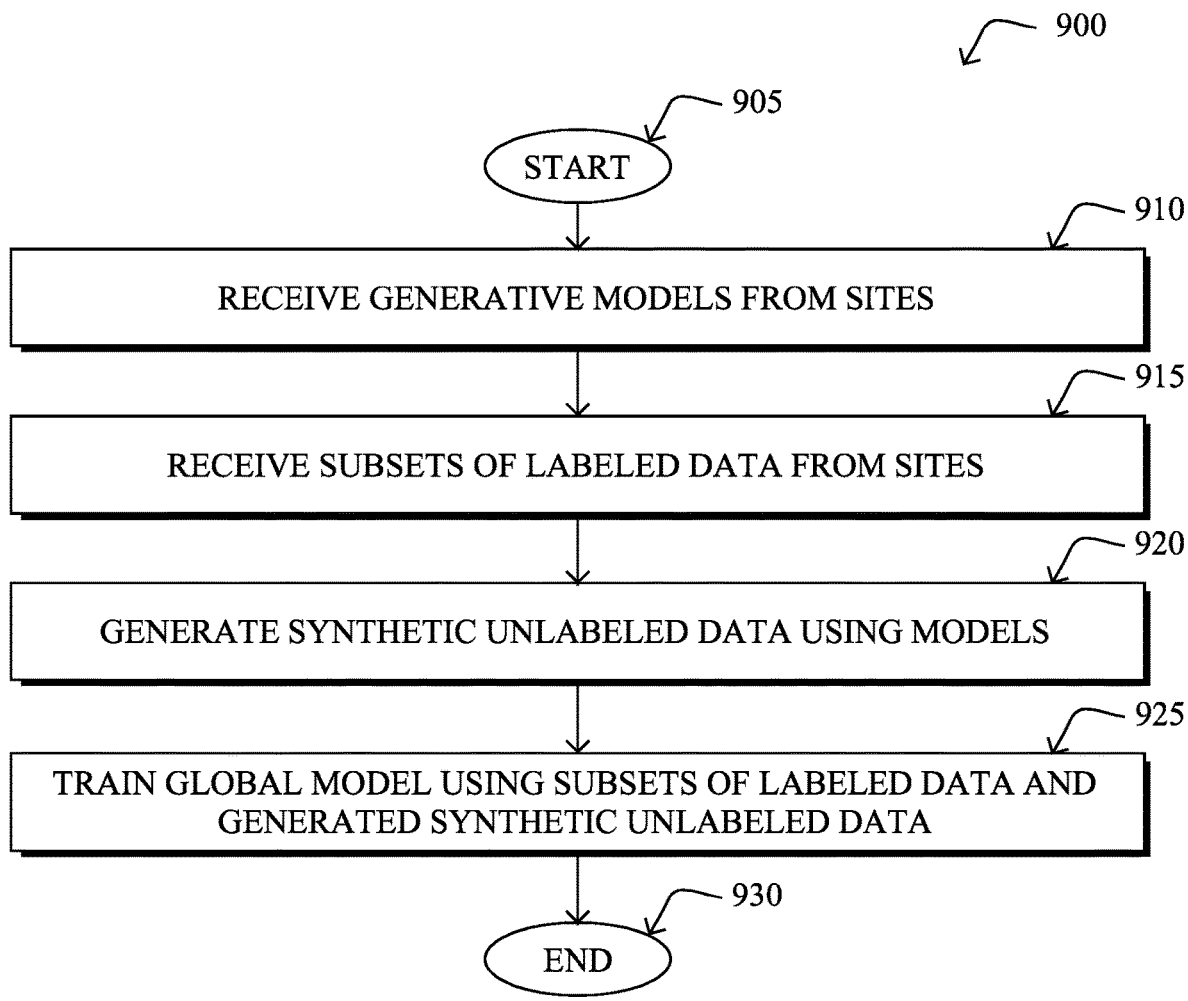
FIG. 9 illustrates an example simplified procedure for machine learning of partially labeled data across multiple sites.

FIG. 9 illustrates an example simplified procedure for machine learning of partially labeled data across multiple sites, in accordance with one or more embodiments described herein. For example, a non-generic, specifically configured device (e.g., device 200) may perform procedure 900 by executing stored instructions (e.g., process 248), to provide a model training service in a network. The procedure 900 may start at step 905, and continues to step 910, where, as described in greater detail above, the service may receive machine learning-based generative models from a plurality of distributed sites. In various embodiments, each generative model may be trained locally a corresponding site using unlabeled data observed at that site. Once trained, the model may generate synthetic unlabeled data that mimics the unlabeled data used to train the generative model. For example, the generative models may be GAN-based models, in some cases.

At step 915, as detailed above, the service may receive, from each of the distributed sites, a subset of labeled data observed at that site. In general, labels may be applied locally at the sites, to classify the sensor or other information captured in that site's network. For example, if a security camera captures an image of a person, and that person also swipes an access badge at that time, the badge reader information regarding the identity of the person can be used to label the captured image of the person.

At step 920, the service may use the generative models to generate synthetic unlabeled data, as described in greater detail above. In general, the synthetic unlabeled data may mimic the characteristics of the real unlabeled data observed at the various sites. In other words, the service may use the generative models to approximate the unlabeled data from the sites, without the unlabeled data having to be sent to the service.

At step 925, as detailed above, the service may train a global machine learning-based model using the received subsets of labeled data received from the distributed sites and the synthetic unlabeled data generated by the generative models. In turn, the global model can be used to classify further data samples from any of the sites. For example, the model could be trained to perform image recognition, network traffic analysis, security assessments (e.g., malware detection), or the like. Procedure 900 then ends at step 930.

It should be noted that while certain steps within procedures 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the centralized training of a global, machine learning-based model, while only requiring a relatively small amount of samples to be sent to the central site for training from a set of distributed data sources. In some aspects, generative models may be used to compress the information from the input data into a relatively small-sized model. In further aspects, the techniques also can avoid sending redundant samples from the unlabeled dataset to the central site by training generative models at the local sites. In addition, the techniques herein provide for the locally trained generative models (e.g., a model of facial images, etc.) to be combined with different labeled data (e.g., labeled with age vs. labeled with gender), to support central learning of different discriminative models.

While there have been shown and described illustrative embodiments that provide for centralized model training in a network, it is to be understood that various other adaptations and modifications may be made within the spirit and scope of the embodiments herein. For example, while certain embodiments are described herein with respect to using certain models for purposes of anomaly detection, image recognition, or the like, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a service, machine learning-based generative models from a plurality of distributed sites, wherein each generative model is trained locally at a site using unlabeled data observed at that site to generate synthetic unlabeled data that mimics the unlabeled data used to train the generative model;
receiving, at the service and from each of the distributed sites, a subset of labeled data observed at that site;
using, by the service, the generative models to generate synthetic unlabeled data; and
training, by the service, a global machine learning-based model using the received subsets of labeled data received from the distributed sites and the synthetic unlabeled data generated by the generative models.

2. The method as in claim 1, wherein each generative model generates an amount of synthetic unlabeled data in proportion to the unlabeled data observed at the corresponding site at which the model was trained.

3. The method as in claim 1, wherein the generative models are trained using labeled data having one or more labels that differ from a label that the global machine learning-based model uses.

4. The method as in claim 1, further comprising:
providing, by the service, the global machine learning-based model to one or more of the distributed sites, wherein the one or more distributed sites use the global machine learning-based model to select which labeled data is to be sent to the service.

5. The method as in claim 1, further comprising:
receiving, at the service, an unlabeled data sample from a particular one of the sites;
using, by the service, the global machine learning-based model to apply a label to the received data sample; and
providing, by the service, an indication of the label applied to the received data sample to the particular site from which the data sample was received.

6. The method as in claim 1, wherein the labeled and unlabeled data observed at the sites comprise image data captured by cameras deployed at sites or network telemetry data.

7. The method as in claim 1, further comprising:
requesting, by the service, additional labeled data from one or more of the sites, based on a loss function associated with the machine learning-based model.

8. The method as in claim 1, wherein the generative models are generative adversarial network (GAN) models.

9. The method as in claim 1, wherein training the global machine learning-based model using the received subsets of labeled data received from the distributed sites and the synthetic unlabeled data generated by the generative models comprises:
mapping the received subsets of labeled data to a feature space, wherein the global machine learning-based model is trained using semi-supervised learning within the feature space.

10. The method as in claim 1, wherein training the global machine learning-based model comprises using an autoencoder on the synthetic data to generate features for the global machine learning-based model.

11. An apparatus, comprising:
one or more network interfaces to communicate with a network;
a processor coupled to the network interfaces and configured to execute one or more processes; and
a memory configured to store a process executable by the processor, the process when executed configured to:
receive machine learning-based generative models from a plurality of distributed sites, wherein each generative model is trained locally at a site using unlabeled data observed at that site to generate synthetic unlabeled data that mimics the unlabeled data used to train the generative model;
receive, from each of the distributed sites, a subset of labeled data observed at that site;
use the generative models to generate synthetic unlabeled data; and
train a global machine learning-based model using the received subsets of labeled data received from the distributed sites and the synthetic unlabeled data generated by the generative models.

12. The apparatus as in claim 11, wherein each generative model generates an amount of synthetic unlabeled data in proportion to the unlabeled data observed at the corresponding site at which the model was trained.

13. The apparatus as in claim 11, wherein the distributed sites each comprise a local area network, and wherein the apparatus provides a cloud-based service to the local area networks.

14. The apparatus as in claim 11, wherein the process when executed is further configured to:
provide the global machine learning-based model to one or more of the distributed sites, wherein the one or more distributed sites use the global machine learning-based model to select which labeled data is to be sent to the service.

15. The apparatus as in claim 11, wherein the process when executed is further configured to:
receive an unlabeled data sample from a particular one of the sites;
use the global machine learning-based model to apply a label to the received data sample; and
provide an indication of the label applied to the received data sample to the particular site from which the data sample was received.

16. The apparatus as in claim 11, wherein the subset of labeled data observed at the site are selected randomly for sending to the apparatus.

17. The apparatus as in claim 11, wherein the generative models are trained using labeled data having one or more labels that differ from a label that the global machine learning-based model uses.

18. The apparatus as in claim 11, wherein the apparatus trains the global machine learning-based model using the received subsets of labeled data received from the distributed sites and the synthetic unlabeled data generated by the generative models by:
mapping the received subsets of labeled data to a feature space, wherein the global machine learning-based model is trained using semi-supervised learning within the feature space.

19. A tangible, non-transitory, computer-readable medium storing program instructions that cause a service to execute a process comprising:
receiving, at the service, machine learning-based generative models from a plurality of distributed sites, wherein each generative model is trained locally at a site using unlabeled data observed at that site to generate synthetic unlabeled data that mimics the unlabeled data used to train the generative model;
receiving, at the service and from each of the distributed sites, a subset of labeled data observed at that site;
using, by the service, the generative models to generate synthetic unlabeled data; and
training, by the service, a global machine learning-based model using the received subsets of labeled data received from the distributed sites and the synthetic unlabeled data generated by the generative models.

20. The computer-readable medium as in claim 19, wherein the process further comprises:
receiving, at the service, an unlabeled data sample from a particular one of the sites;
using, by the service, the global machine learning-based model to apply a label to the received data sample; and
providing, by the service, an indication of the label applied to the received data sample to the particular site from which the data sample was received.

* * * * *

UNITED STATES PATENT AND TRADEMARK OFFICE
CERTIFICATE OF CORRECTION

PATENT NO. : 11,699,080 B2
APPLICATION NO. : 16/131150
DATED : July 11, 2023
INVENTOR(S) : Xiaoqing Zhu et al.

It is certified that error appears in the above-identified patent and that said Letters Patent is hereby corrected as shown below:

In the Specification

Column 1, Line 63, please amend as shown:
FIG. 7 illustrates an example autoencoder;

Column 2, Line 30, please amend as shown:
same general physical location, such as a building or Column 4, Line 17, please amend as shown:
figuration protocol (DHCP) server, a constrained appli- Signed and Sealed this
Twenty-first Day of November, 2023

Katherine Kelly Vidal
*Director of the United States Patent and Trademark Office*